(12) United States Patent
Park et al.

(10) Patent No.: US 7,940,245 B2
(45) Date of Patent: May 10, 2011

(54) DISPLAY AND CONTROL METHOD THEREOF

(75) Inventors: Kil-soo Park, Suwon-si (KR); Kyung-sun Min, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1950 days.

(21) Appl. No.: 11/017,109

(22) Filed: Dec. 21, 2004

(65) Prior Publication Data
US 2005/0156868 A1    Jul. 21, 2005

(30) Foreign Application Priority Data

Dec. 24, 2003  (KR) .................. 10-2003-0096392

(51) Int. Cl.
*G09G 5/10*    (2006.01)
(52) U.S. Cl. .................. 345/102; 345/690; 345/89
(58) Field of Classification Search .................. 345/690, 345/204, 102, 89
See application file for complete search history.

(56) References Cited

U.S. PATENT DOCUMENTS

| | | | | |
|---|---|---|---|---|
| 5,089,891 A | * | 2/1992 | Yamamoto | 348/674 |
| 6,463,173 B1 | | 10/2002 | Tretter | |
| 7,227,559 B2 | * | 6/2007 | Aoki et al. | 345/690 |

FOREIGN PATENT DOCUMENTS

| | | |
|---|---|---|
| EP | 0654943 A | 5/1995 |
| EP | 1111578 A | 6/2001 |
| JP | 4-270378 A | 9/1992 |
| JP | 6-22249 A | 1/1994 |
| JP | 6-214508 A | 8/1994 |
| JP | 11-73162 A | 3/1999 |
| JP | 2002-14660 A | 1/2002 |
| JP | 2002-32547 A | 1/2003 |
| JP | 2003-32547 A | 1/2003 |
| KR | 20-266865 Y1 | 12/1998 |
| KR | 10-343692 B1 | 7/2000 |
| KR | 20-0266865 Y1 | 2/2002 |
| KR | 10-0343692 B1 | 6/2002 |
| KR | 2002-0067852 A | 8/2002 |
| KR | KP 2002-0067852 * | 8/2002 |
| KR | 2003-0067037 A | 8/2003 |
| KR | 2003-0067948 A | 8/2003 |
| KR | 2003-0067959 A | 8/2003 |
| KR | 1020030080176 A | 10/2003 |
| KR | 2003-0089273 A | 11/2003 |

OTHER PUBLICATIONS

Y. T. Kim "Contrast Enhancement Using Brightness Preserving Bi-Histogram Equalization" IEEE Transactions on Consumer Electronics., Feb. 1997, pp. 1-8, vol. 43, No. 1, New York.

* cited by examiner

*Primary Examiner* — Amr Awad
*Assistant Examiner* — Leonid Shapiro
(74) *Attorney, Agent, or Firm* — Sughrue Mion, PLLC

(57) ABSTRACT

A display including: an LCD panel to display an inputted video signal from the outside; a middle level controller to increase a middle brightness signal level of the inputted video signal; a contrast controller to control a contrast of a video signal outputted from the middle level controller; a brightness mean calculating part to calculate a brightness mean of a video signal from one of the middle level controller and the contrast controller; and a controller controlling the contrast controller to control the contrast according to a result calculated by the brightness mean calculating part and a control method thereof. Thus, the contrast is controlled according to the brightness mean of one of the video signal having the controlled contrast and the video signal having the increased middle brightness signal level, which enables displaying an optimal image.

15 Claims, 16 Drawing Sheets

DISPLAY AND CONTROL METHOD THEREOF

CROSS-REFERENCE TO RELATED APPLICATIONS

This application claims the benefit of Korean Patent Application No. 2003-96392, filed Dec. 24, 2003, in the Korean Intellectual Property Office, the disclosure of which is incorporated herein by reference.

BACKGROUND OF THE INVENTION

1. Field of the Invention

Apparatuses and methods consistent with the present invention relates to a display and a control method thereof, and more particularly, to a display in which contrast is improved according to a brightness mean of an inputted video signal to display an optimal image and a control method thereof.

2. Description of the Related Art

A control of contrast is an important element to determine the image quality of a display.

A generally used method to control the contrast of a video signal is histogram equalization.

The histogram equalization is a method in which a histogram distribution of an input image is controlled to form a predetermined shape of a histogram of an outputted image.

However, if the contrast is controlled through histogram equalization, the predetermined shape of a histogram is kept constant without regard to a change of a brightness mean of the input image, which is not sufficient to display an optimal image.

SUMMARY OF THE INVENTION

Accordingly, it is an aspect of the present invention to provide a display in which a contrast is improved according to a brightness mean of an inputted video signal to display an optimal image and a control method thereof.

Additional aspects and/or advantages of the invention will be set forth in part in the description which follows and, in part, will be obvious from the description, or may be learned by practice of the invention.

The foregoing and/or other aspects of the present invention are achieved by providing a display comprising: an LCD panel to display an inputted video signal from the outside; a middle level controller to increase a middle brightness signal level of the inputted video signal; a contrast controller to control a contrast of a video signal outputted from the middle level controller; a brightness mean calculating part to calculate a brightness mean of a video signal from one of the middle level controller and the contrast controller; and a controller controlling the contrast controller to control the contrast according to a result calculated by the brightness mean calculating part.

According to an aspect of the invention, the display further comprises a back light to illuminate the LCD panel and an inverter to supply driving power to the back light and to control an intensity of illumination of the back light, wherein the controller controls a dimming of the back light according to the result calculated by the brightness mean calculating part.

According to an aspect of the invention, the contrast controller controls the contrast in a contrast control range between a cutoff value and an upper limit value, and the controller decreases the contrast control range of the contrast controller, as the brightness mean becomes higher and higher, according to the result calculated by the brightness mean calculating part.

According to an aspect of the invention, the display further comprises a range mean calculating part to calculate a mean of an upper range between the brightness mean and the upper limit value and of a lower range between the cutoff value and the brightness mean, respectively, wherein the controller controls the contrast controller to form a contrast transmitting curve having the upper range convex upwardly if a mean of the upper range is near the brightness mean and to form the contrast transmitting curve having the upper range concave downwardly if the mean of the upper range is near the upper limit value and to form the contrast transmitting curve having the lower range convex upwardly if a mean of the lower range is near the cutoff value and to form the contrast transmitting curve having the lower range concave downwardly if the mean of the lower range is near the brightness mean, according to the result calculated by the brightness mean calculating part and the range mean calculating part.

According to an aspect of the invention, the controller controls the contrast controller to form a contrast transmitting curve in which the upper range between the brightness mean and the upper limit value is convex upwardly and the lower range between the cutoff value and the brightness mean is concave downwardly.

According to an aspect of the invention, the controller controls the contrast controller to form the contrast transmitting curve in which an increment of the upper range is larger than a decrement of the lower range, as the brightness mean becomes smaller and smaller and the increment of the upper range is smaller than the decrement of the lower range as the brightness mean becomes larger and larger.

According to an aspect of the invention, the display further comprises a dimming processor to supply a dimming control signal to the inverter, wherein the controller controls the dimming processor that the more a changeable range of the dimming control signal is, the more the brightness mean is changed, as the brightness mean is changed.

The foregoing and/or other aspects of the present invention are achieved by providing a control method of a display comprising an LCD panel to display an inputted video signal from the outside, the control method comprising: increasing a middle brightness signal level of the inputted video signal; controlling a contrast of the inputted video signal having a increased middle brightness signal level; calculating a brightness mean of one of the video signal having the increased middle brightness signal level and the video signal having the controlled contrast; and controlling the contrast according to the calculated brightness mean.

According to an aspect of the invention, the control method of the display further comprises controlling a dimming of a back light to illuminate the LCD panel according to the brightness mean.

According to an aspect of the invention, the control method of the display further comprises the more decreasing a contrast control range between a cutoff value and a upper limit value, the higher the brightness mean becomes.

According to an aspect of the invention, the control method of the display further comprises: calculating a mean of an upper range between the brightness mean and the upper limit value and of a lower range between the cutoff value and the brightness mean, respectively; controlling the contrast by forming a contrast transmitting curve having the upper range convex upwardly if a mean of the upper range is near the brightness mean and forming the contrast transmitting curve having the upper range concave downwardly if the mean of the upper range is near the upper limit value and forming the contrast transmitting curve having the lower range convex upwardly if a mean of the lower range is near the cutoff value and forming the contrast transmitting curve having the lower range concave downwardly if the mean of the lower range is near the brightness mean.

According to an aspect of the invention, the control method of the display further comprises controlling the contrast controller by forming a contrast transmitting curve in which the upper range between the brightness mean value and the upper limit value is convex upwardly and the lower range between the cutoff value and the brightness mean is concave downwardly.

According to an aspect of the invention, the control method of the display further comprises forming the contrast transmitting curve in which the increment of the upper range is larger than the decrement of the lower range, as the brightness mean becomes smaller and smaller and the increment of the upper range is smaller than the decrement of the lower range, as the brightness mean becomes larger and larger.

According to an aspect of the invention, the control method of the display further comprises increasing a changeable range of the dimming control signal as a change of the brightness mean becomes larger, if the brightness is changed.

BRIEF DESCRIPTION OF THE DRAWINGS

The above and/or other aspects and advantages of the present invention will become apparent and more readily appreciated from the following description of the embodiments, taken in conjunction with the accompany drawings of which:

FIGS. 1A-1-4 and 11B show analog dimming voltage signals;

DETAILED DESCRIPTION OF THE EXEMPLARY EMBODIMENTS

Figure 1:
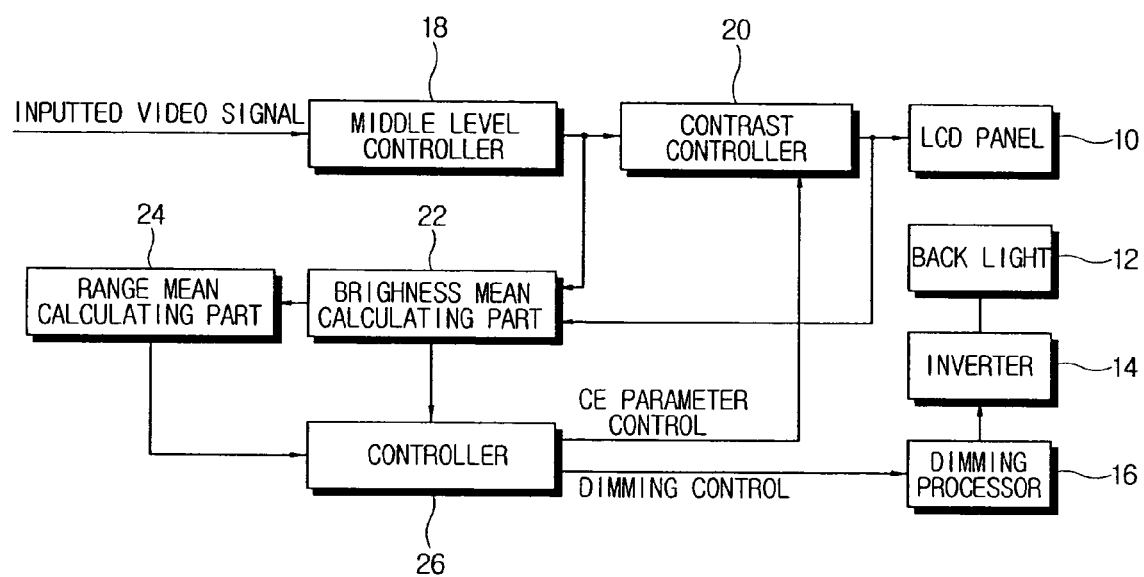
FIG. 1 is a control block diagram of a display according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

As shown in FIG. 1, a display according to an embodiment of the present invention comprises a liquid crystal display (LCD) panel 10, a back light 12 to illuminate the LCD panel 10, an inverter 14 to operate the back light 12, a middle level controller 18 to increase a middle brightness signal level of an inputted video signal, a contrast controller 20 to control a contrast of a video signal having the middle brightness signal level increased by the middle level controller 18 and to output the controlled contrast to the LCD panel 10, a dimming processor 16 outputting a dimming control signal to control a dimming of the back light 12, a brightness mean calculating part 22 to calculate a brightness mean of one of video signals outputted from the middle level controller 18 and the contrast controller 20, and a controller 26 to control the contrast controller 20 and the dimming processor 16 according to a result calculated by the brightness mean calculating part 22. The display according to the embodiment of the present invention comprises further a power supply (not shown) to convert an alternating current (AC) from the outside into a direct current (DC) and to supply the converted DC to the inverter 14.

The inverter 14 to which the DC is supplied from the power supply converts the supplied DC into an AC and supplies it to the back light 12 to operate the back light 12.

The inverter 14 controls the DC supplied from the power supply according to a dimming control signal from the dimming processor 16 to supply it to the back light 12. The inverter 14 uses a lightness control method such as analog dimming, pulse width modulating (PWM) dimming and a complex method of analog dimming and PWM dimming, so that an analog dimming voltage level or a PWM dimming signal is supplied from the dimming processor 16 to the inverter 14.

Figure 2:
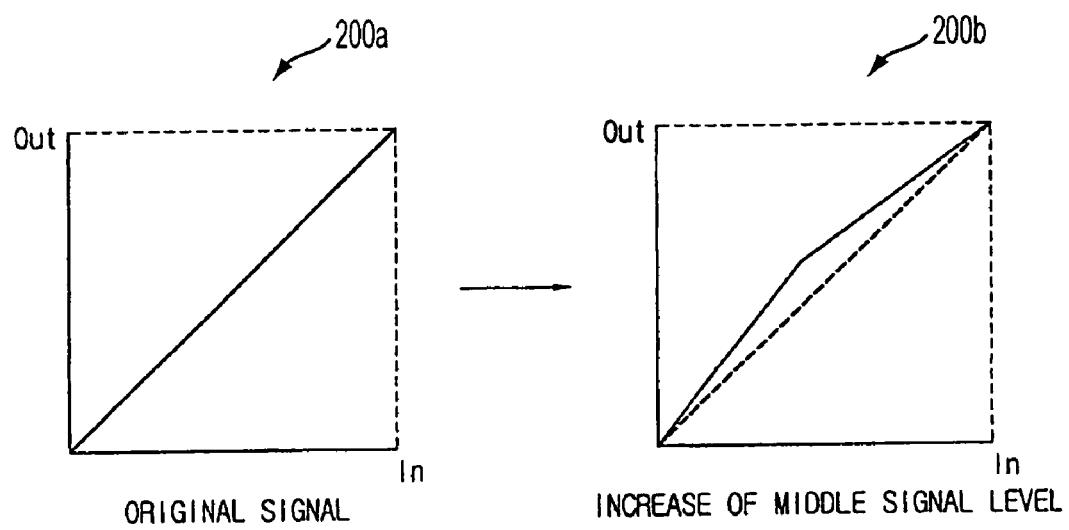
FIG. 2 shows graphs of an inputted video signal and a video signal passing through a middle level controller.

In FIG. 2, the middle brightness signal level of the inputted video signal, or the original signal 200a, from the outside is increased by the middle level controller 18 as shown in graph 200b, and the contrast of the video signal having the increased middle brightness signal level is controlled by the contrast controller 20.

Figure 3:
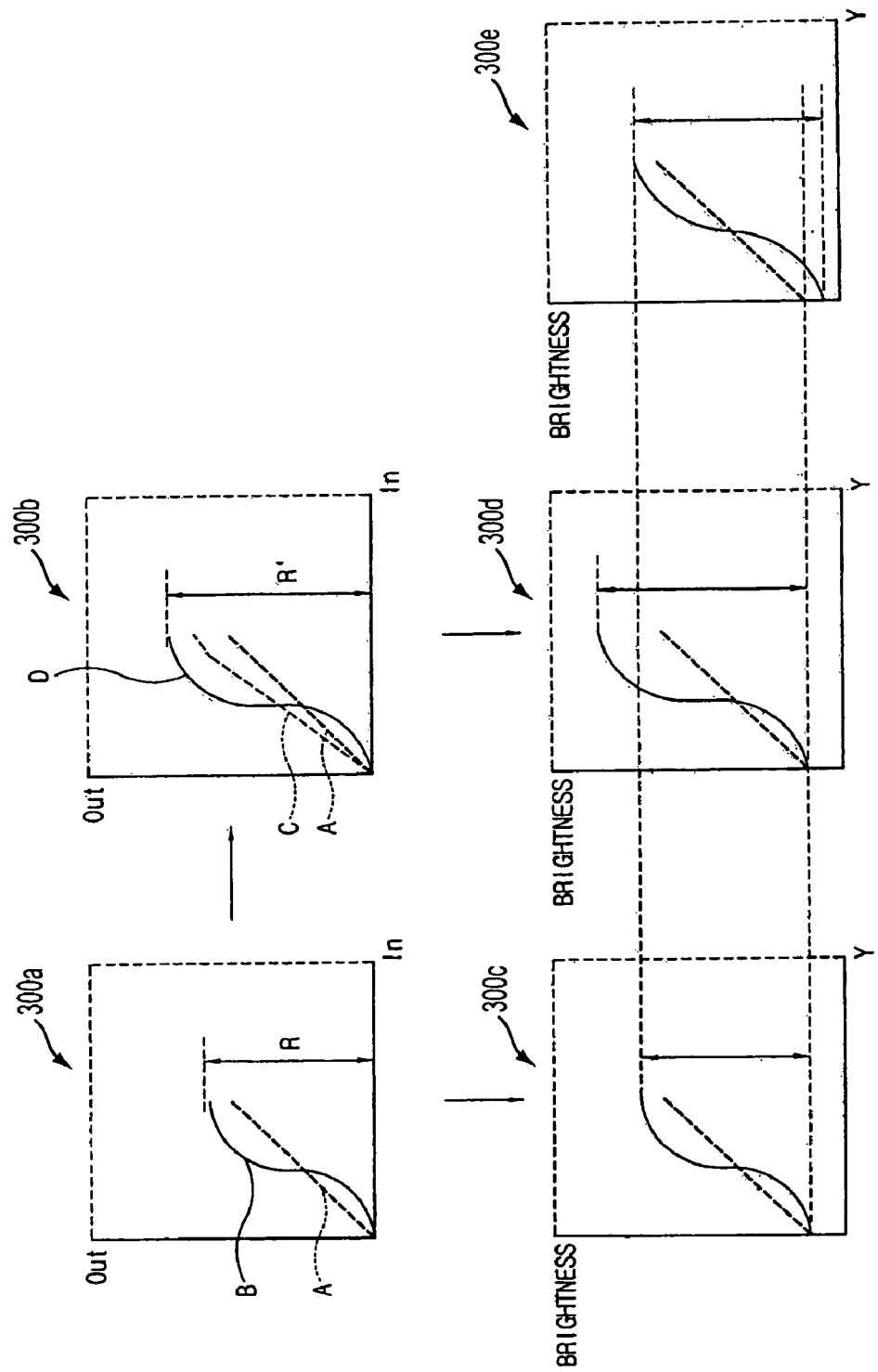
FIG. 3 shows graphs of results after a contrast of the video signal is controlled.

Graph 300a of FIG. 3 shows a result B after the contrast of the inputted video signal A is controlled and graph 300b of FIG. 3 shows a result D after the contrast of the video signal C having the increased middle brightness signal level is controlled. As shown in graph 300b of FIG. 3, if the contrast of the video signal C having the increased middle brightness signal level is controlled, a dynamic range R' for controlling the contrast is increased, which is more effective to improve the contrast.

Graphs 300c, 300d of FIG. 3 show a brightness on the LCD panel of the video signal of graphs 300a, 300b of FIG. 3, respectively. As shown in FIG. 3, an image on the LCD panel 10 of graph 300d is brighter than that of graph 300c and the dynamic range of the brightness of graph 300d is wider than that of graph 300c.

However, as a dark image becomes brighter, it may look apart or separate from the display panel 10, so that the dimming process as follows is required. That is, as shown in graph 300e in FIG. 3, the lightness of the bright image is kept constant and a black level is decreased or a brightness of the dark image is decreased to improve the contrast as a whole.

The brightness mean calculating part 22 calculates a brightness mean Y Mean of video signals from one of the middle level controller 18 and the contrast controller 20.

The display according to the embodiment of the present invention may further comprise a range mean calculating part 24 to calculate a mean of each of an upper range and a lower range on the basis of the brightness mean calculated by the brightness mean calculating part 22.

Figure 4:
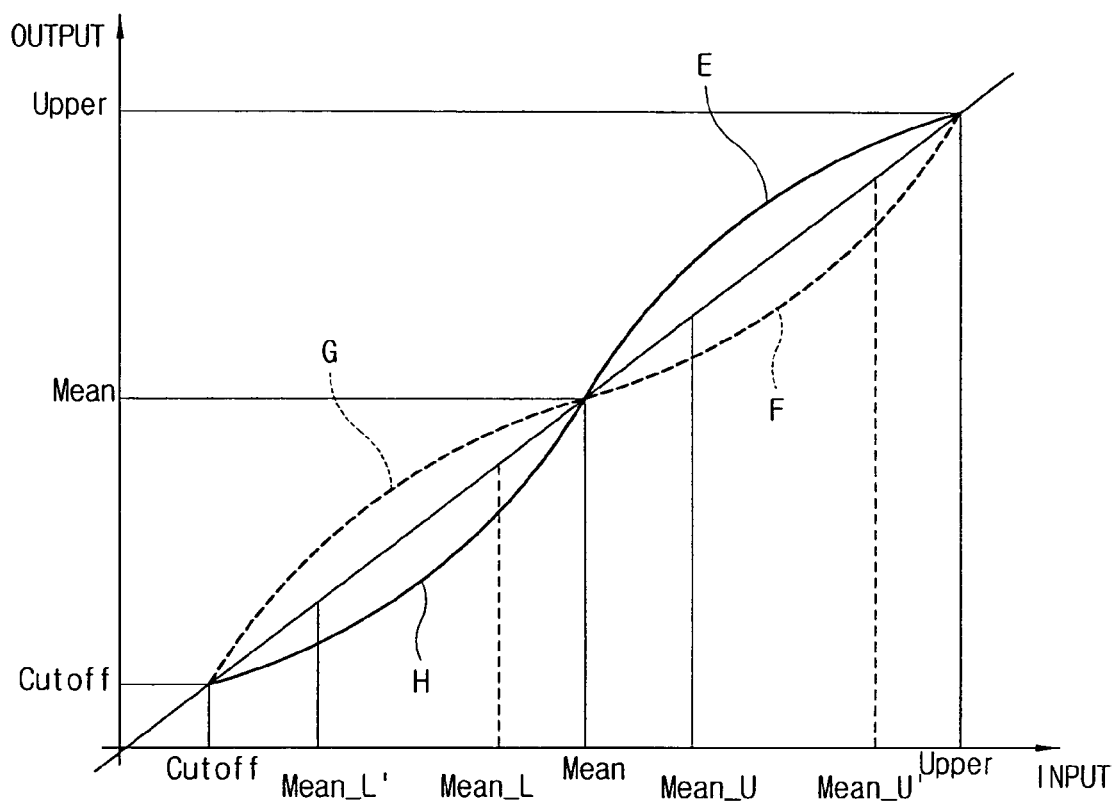
FIGS. 4 and 5A-B are graphs showing contrast transmitting curves.

Then, the controller 26 controls contrast control parameters, so that the contrast controller 20 forms a contrast transmitting curve as shown in FIG. 4 according to a result calculated by the brightness mean calculating part 22 and the range mean calculating part 24.

Here, the contrast control parameters comprise a cutoff value Cutoff and an upper limit value Upper of the contrast control range in the contrast transmitting curve and an increment Alpha_U and a decrement Alpha_L of the brightness level of the inputted video signal.

Referring FIG. 4, a brief description of forming the contrast transmitting curve follows.

The controller 26 controls the contrast control parameters so that the contrast controller 20 forms a upwardly convex transmitting curve E if the mean of the upper range Mean_U calculated by the range mean calculating part 24 is near the brightness mean Mean calculated by the brightness mean calculating part 22, and the contrast controller 20 forms a contrast downwardly concave transmitting curve F if the mean of the upper range Mean_U' calculated by the range mean calculating part 24 is near the upper limit value Upper of the contrast control range. Further, if the mean of the lower range Mean_L' is near the cutoff value Cutoff of the contrast control range, the contrast controller 20 forms an upwardly convex transmitting curve G and if the mean of the lower range Mean_L is near the brightness mean Mean, the contrast controller 20 forms a downwardly concave transmitting curve H.

Figure 5A:
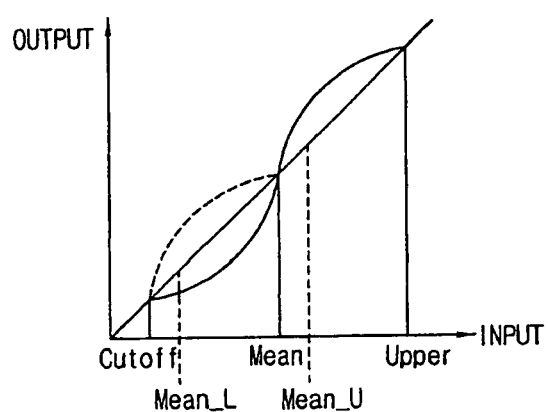
Figure 5B:
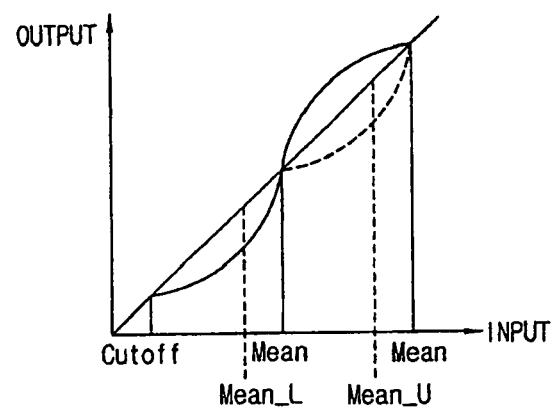

As an aspect of the present invention, as shown in FIGS. 5A-B, the controller 26 may control the contrast controller 20 to form a contrast transmitting curve in which an upper range Mean~Upper with respect to the brightness mean Mean is convex upwardly and a lower range Cutoff~Mean with respect to the brightness mean Mean is concave downwardly, without regard to the range mean. Then, a dark image looking apart or separate from the display panel 10 in the lower range and the lightness becoming lower than that of the inputted video signal in the upper range are prevented.

Hereinbelow, the contrast transmitting curve having the upper range convex upwardly and the lower range concave downwardly is taken as an example for convenience in description.

Figure 6A:
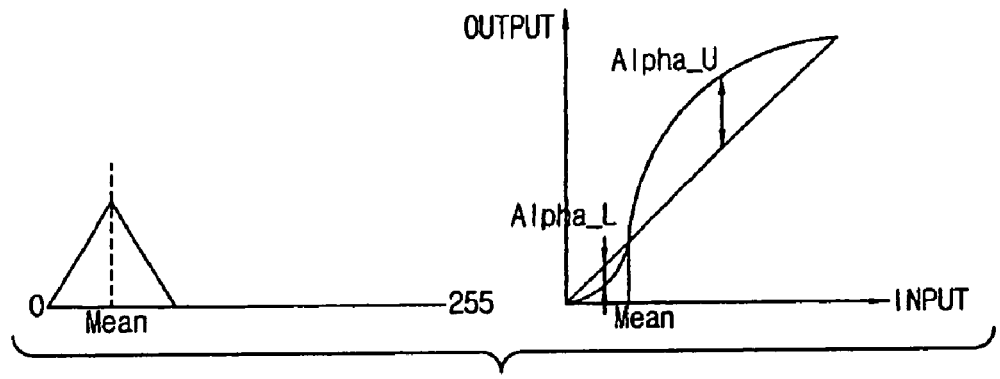
FIGS. 6A-C are graphs showing changes of the contrast transmitting curves according to brightness means.
Figure 6B:
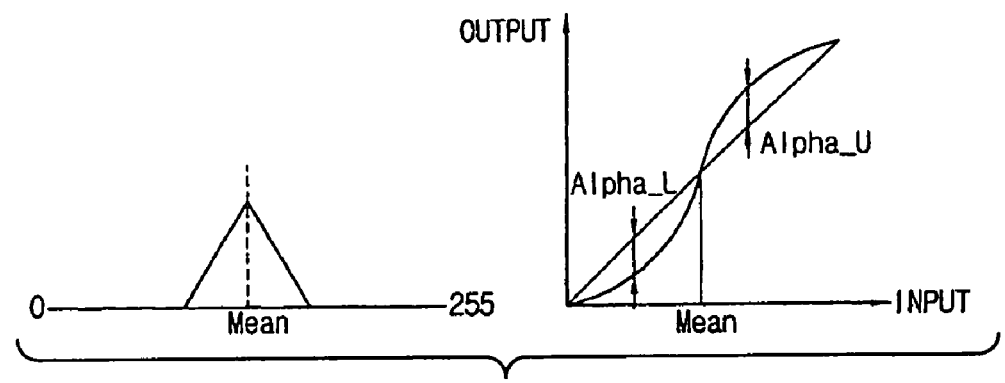
Figure 6C:
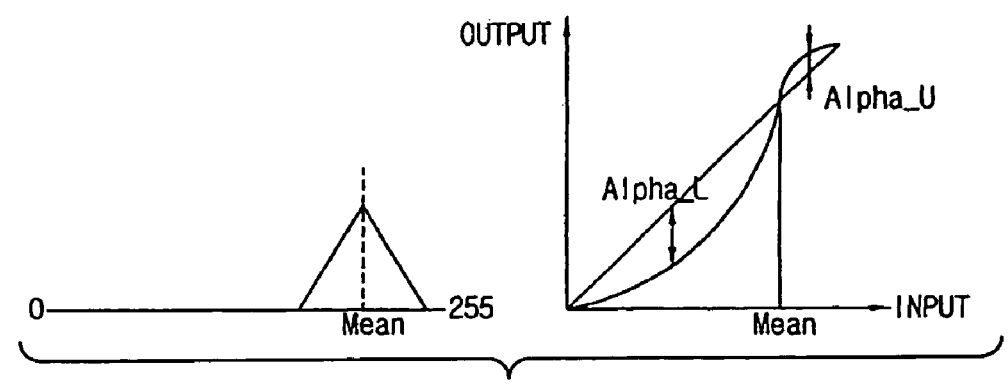

FIGS. 6A-C show three types of contrast transmitting curves formed according to the respective brightness means calculated by the brightness mean calculating part 22. If the brightness mean is low as shown in FIG. 6A, the controller 20 controls so that an increment Alpha_U of the brightness level above the brightness mean is larger than a decrement Alpha_L below the brightness mean and the controller 26 increases the lightness of the image as a whole to improve the contrast.

As shown in FIG. 6B, if the brightness mean is at a middle level, the controller 26 controls so that an increment Alpha_U and a decrement Alpha_L of the brightness level in the upper range and the lower range with respect to the brightness mean are approximately the same to improve the contrast.

As shown in FIG. 6C, if the brightness mean is high, the controller 26 controls the contrast control parameters so that an increment Alpha_U of the brightness level in the upper range is smaller than a decrement Alpha_L of the brightness level in the lower range and the controller 26 keeps the lightness proper to improve the contrast, with respect to the brightness mean.

Figure 7A:
FIGS. 7A-C and 8A-C are graphs showing changes of contrast control ranges according to brightness means.
Figure 7B:
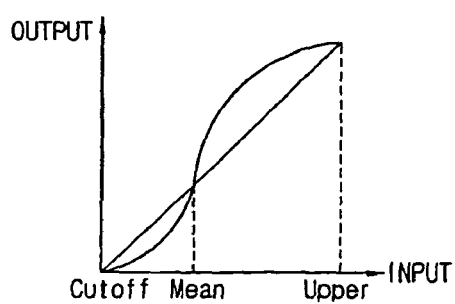
Figure 7C:
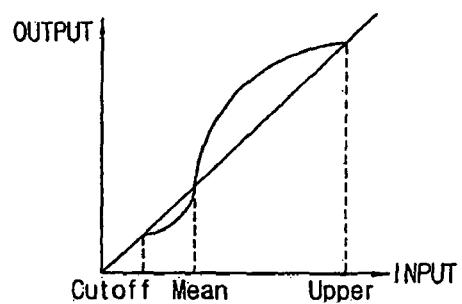

If the brightness mean is low as shown in FIG. 7A, the controller 26 controls the contrast controller 20 to increase the contrast control range Cutoff~Upper as shown in FIG. 7B to control the contrast of the inputted video signal in a whole range. If the contrast is controlled as shown in FIG. 7C, an increment of the high brightness level is decreased, which makes the whole image dark and the contrast is not efficiently improved.

Figure 8A:
Figure 8B:
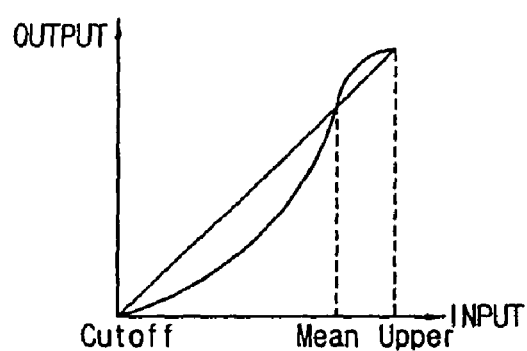
Figure 8C:
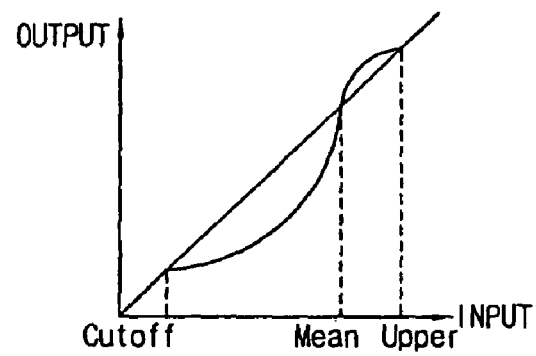

If the brightness mean is high as shown in FIG. 8A, the controller 26 controls the contrast controller 20 so that the contrast of the inputted video signal is not controlled throughout the whole range as shown in FIG. 8B, but the contrast control range is decreased as shown FIG. 8C.

If the contrast transmitting curve is formed as shown in FIG. 8B, the brightness level 255 increases and is saturated to make the image deformed and a decrement of the dark brightness level is large, which may output an overly dark video signal. Thus, according to the embodiment of the present invention, the contrast is controlled as shown in FIG. 8C.

Figure 9A:
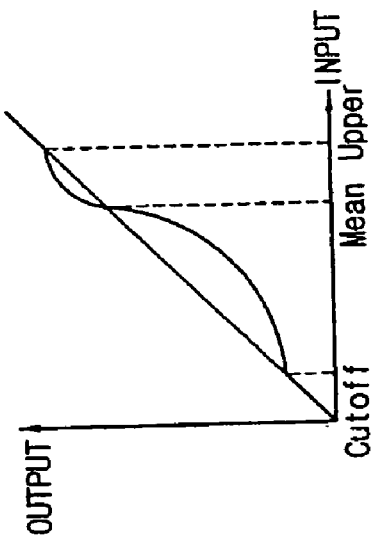
FIGS. 9A-C are graphs synthetically showing contrast transmitting curves on the base of FIGS. 5A through 8C.
Figure 9B:
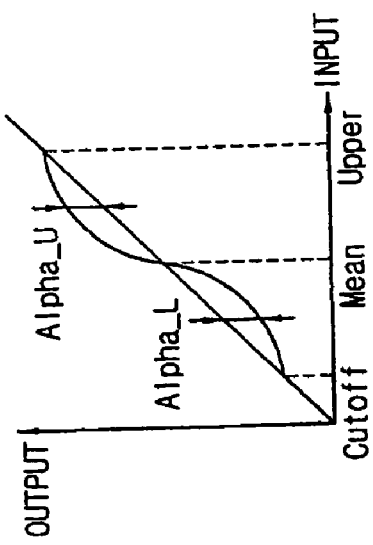
Figure 9C:
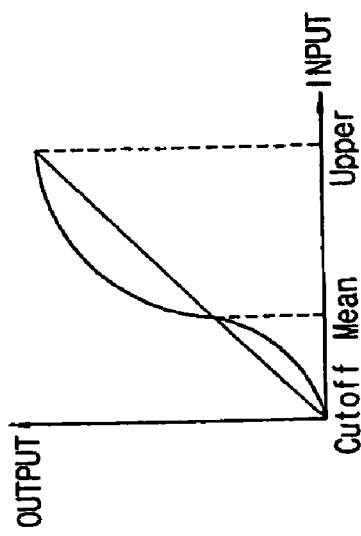

As shown in FIGS. 9A-C, the controller 26 controls the contrast controller 20 to form the contrast transmitting curves of shapes as shown in FIGS. 8A-C, according to the brightness mean.

Figure 10A:
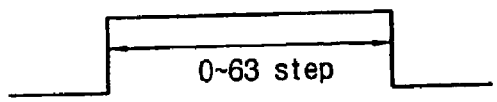
FIGS. 10A-C show pulse width modulation (PWM) dimming control signals.

As shown FIG. 10A, the controller 26 has the brightness mean previously classified into 0~63 steps in memory and calculates the dimming control amount corresponding to the step if the brightness mean calculated by the brightness mean calculating part 22 is input and the controller controls the dimming processor 16. Specifically FIG. 10A shows the PWM signal for step 63.

Figure 10B:
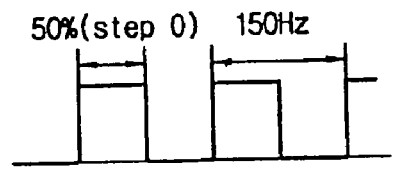
Figure 10C:
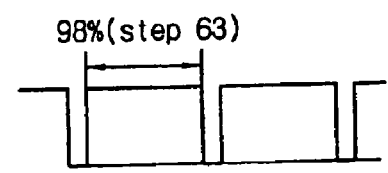

The dimming processor 16 outputs corresponding PWM signal as shown FIGS. 10B-C to the inverter 14 based on the dimming control signal supplied from the controller 26. Then, the amount of power supplied from the inverter 14 to the back light 12 is controlled and dimming is accomplished.

Figures 1, 11A:
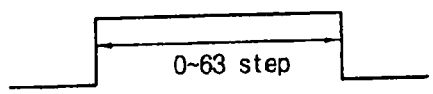
Figures 2, 11A:
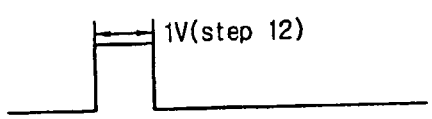
Figure 11B:
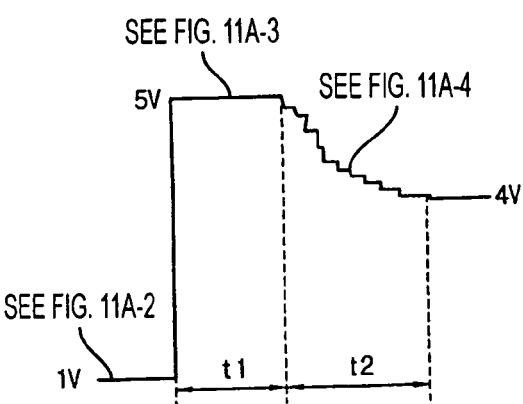
Figures 3, 11A:
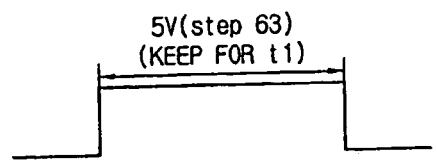
Figures 4, 11A:
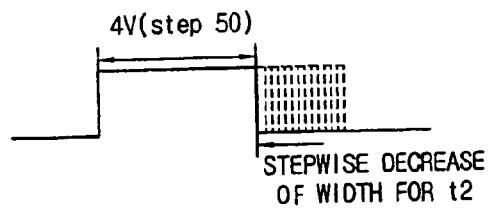

As shown in FIGS. 11A-1 through 11B and similar to FIGS. 10A-C, the controller 26 has the brightness mean previously classified into 0~63 steps in memory and calculates the dimming control amount corresponding to the step if the brightness mean calculated by the brightness mean calculating part 22 is input and the controller controls the dimming processor 16. The PWM signal for step 63 is shown in FIG. 1A-1, the PWM signal for step 12 having a 1 volt analog signal is shown in FIG. 11A-2. FIG. 11A-3 shows the PWM signal for step 63 that is kept for t1. In FIG. 11A-4, the PWM signal having a stepwise decrease in duty cycle to achieve an analog voltage of 4 volts for step 50 is kept for t2. FIG. 11B shows the change in the analog signal as the PWM signals of FIG. 11A-2 through 11A-4 are applied.

The dimming processor 16 outputs a corresponding analog voltage signal for a corresponding time based on the dimming control signal to the inverter 14 to control the dimming of the back light 12.

It was described that the brightness mean is classified into 0~63 steps, but is not limited thereto.

Figure 12A:
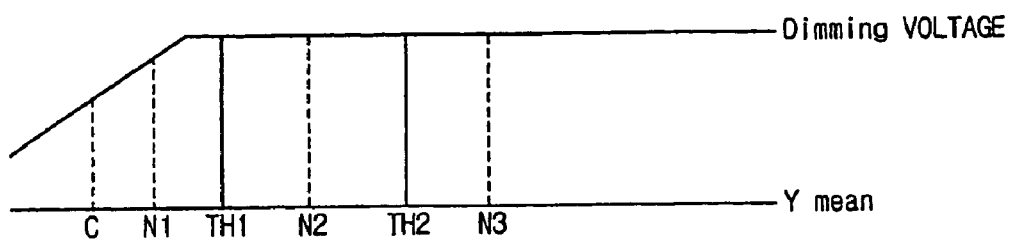
FIGS. 12A through 14B show changes of the analog dimming voltage signals according to the brightness mean.
Figure 13A:
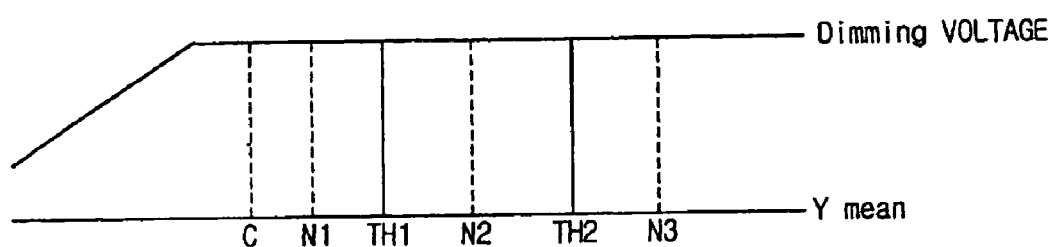
Figure 14A:
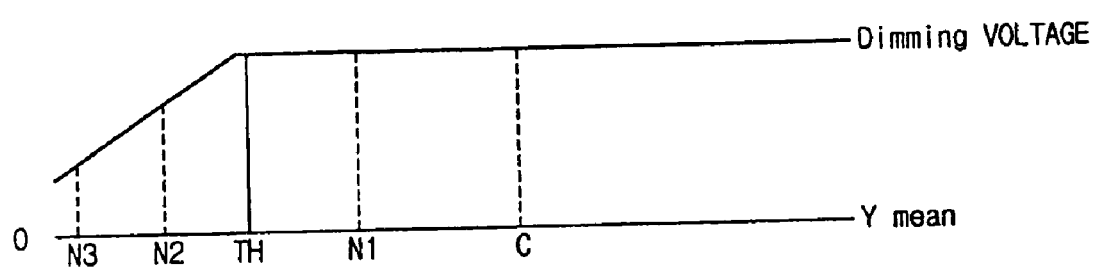

FIG. 12A, FIG. 13A and FIG. 14A show corresponding dimming voltage signals that the dimming processor 16 outputs corresponding to the brightness mean. Here, TH 1, TH 2 and TH 3 are critical values.

If the controller 26 determines that the brightness mean inputted from the brightness mean calculating part 22 is changed, the controller 26 controls the dimming processor 16 to output the corresponding dimming voltage signal.

Figure 12B:
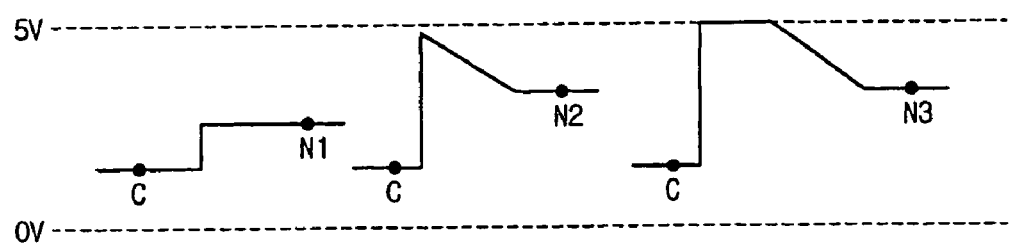

As shown in FIG. 12B, if the brightness mean is changed from C to N1, the controller 26 controls the dimming processor 16 to increase the dimming voltage to the corresponding dimming voltage and to output the corresponding dimming voltage.

If the brightness mean is changed from C to N2 or N3, the controller 26 controls the dimming processor 16 to output the dimming voltage at the same level. However, as shown in FIG. 12B, the overall change of the dimming voltage is larger when the brightness mean is changed from C into N3 than from C to N2 since the change of brightness mean is larger when the brightness mean is changed from C into N3. In other words, the overall change or variation of the brightness mean signal is larger because the brightness mean stays at the 5 v level for a longer period of time when the brightness mean changes from C to N3, than when the brightness mean changes from C to N2.

Figure 13B:
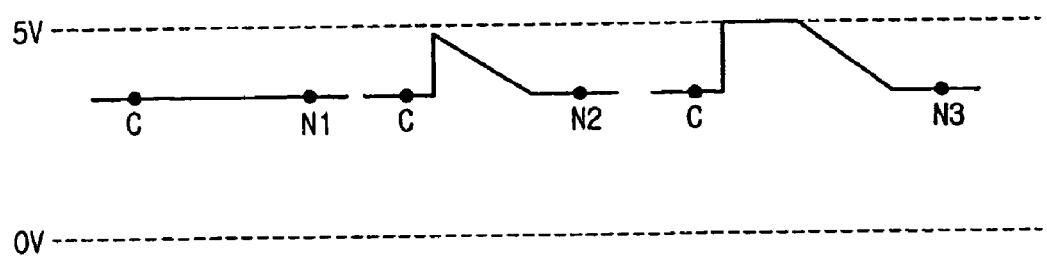

Likewise, as shown in FIG. 13B, the controller 26 controls the dimming processor 16 to output the same level of dimming voltage corresponding to the change of the brightness mean and to make the overall change of the dimming voltage larger and larger if the brightness mean is changed to be larger than the critical values TH 1 and TH 2.

Figure 14B:
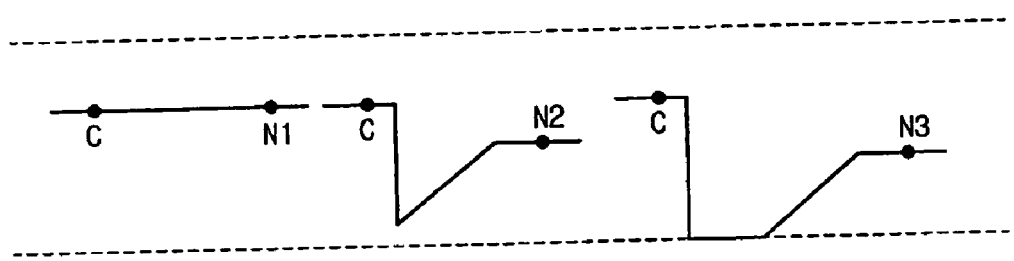

FIG. 14B shows an example in which the brightness mean is decreased. A detailed description is not provided since the controller 26 is operated in the same way as FIG. 12B and FIG. 13B.

In the display according to the embodiment of the present invention, the dynamic range of the dimming is increased, which enables improvements in the contrast.

Here, the dimming of the back light 12 may be controlled by varying the PWM signal according to the brightness mean.

Figure 15:
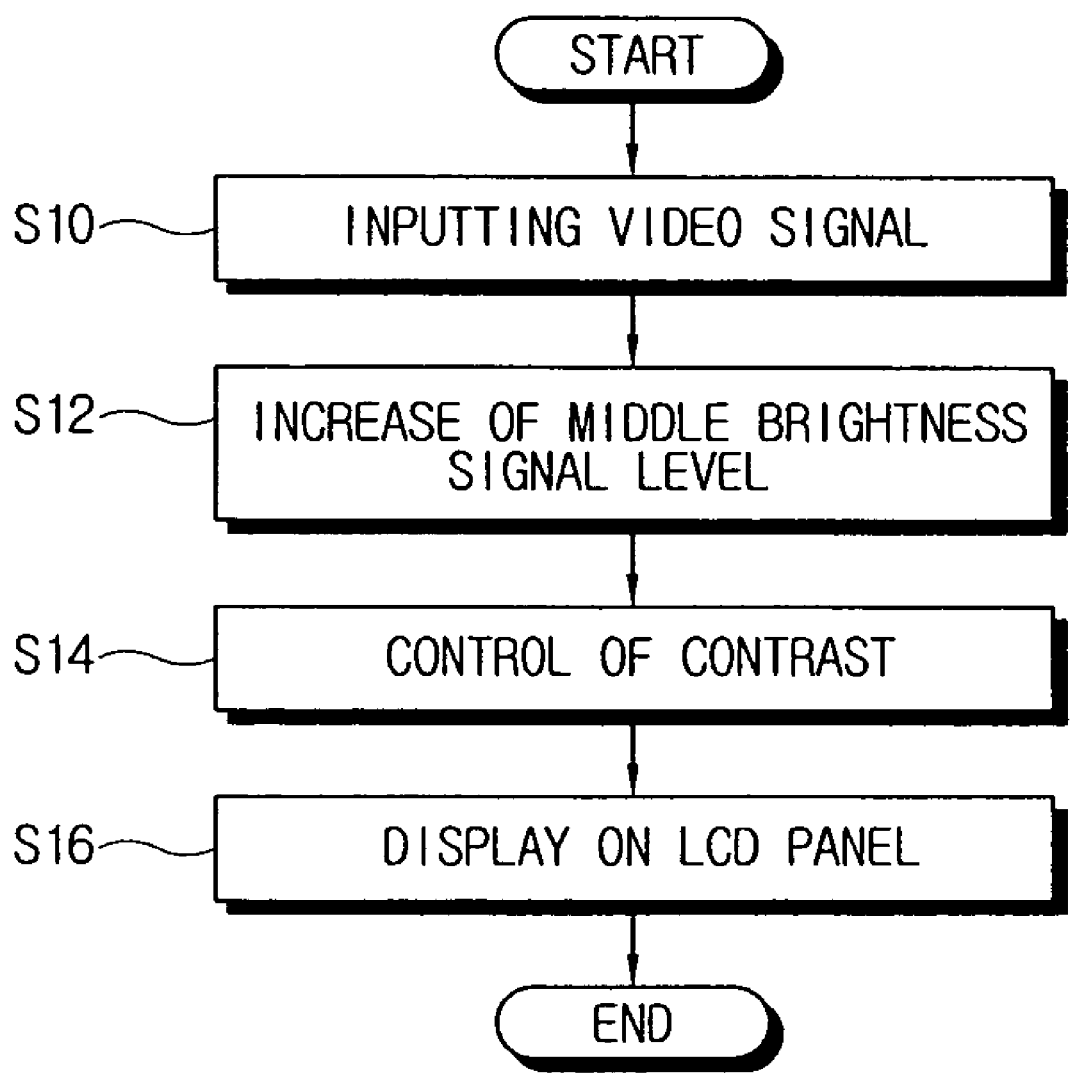
FIG. 15 is a flow chart displaying an image on the display according to the embodiment of the present invention.

As shown in FIG. 15, in the display according to the embodiment of the present invention, if a video signal is input at operation S10, the middle brightness signal level of the inputted video signal is increased by the middle level controller 18 at operation S12. Then, the contrast of the inputted video signal having the increased middle brightness signal level is controlled by the contrast controller 20 at operation S14. The video signal having the controlled contrast is displayed on the LCD panel 10 at operation S16.

Figure 16:
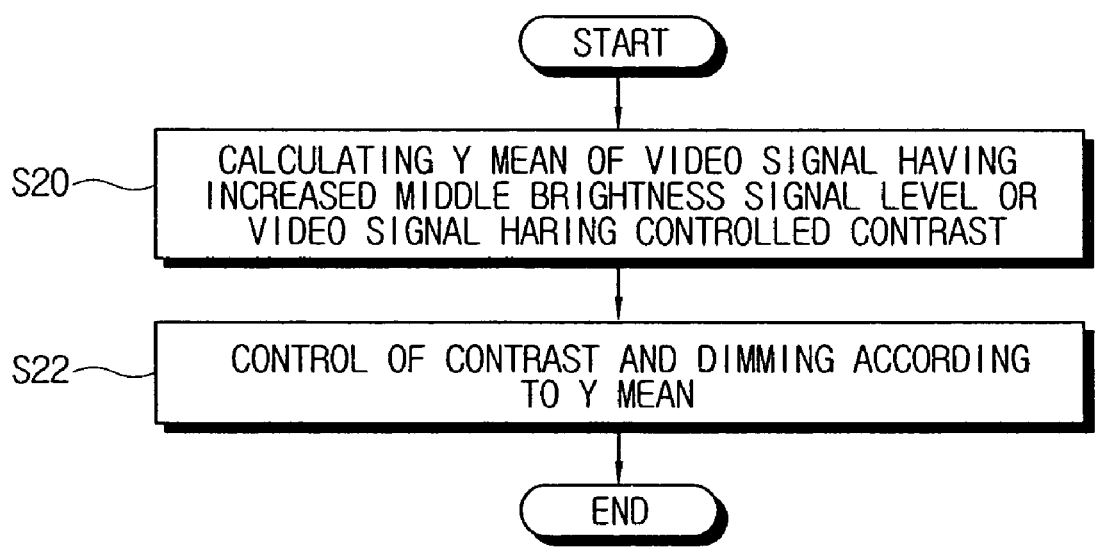
FIG. 16 is a control flow chart of the display according to the embodiment of the present invention.

As shown in FIG. 16, first, the brightness mean calculating part 22 in which the video signal having the controlled contrast at operation S14 in FIG. 15 or the video signal having the increased middle brightness signal level at operation S12 in FIG. 15 is input and calculates the brightness mean at operation S20. The controller 26 controls the contrast controller 20 and the dimming processor 16 to control the contrast and the dimming of the video signal according to the brightness mean calculated by the brightness mean calculating part 22 at operation S22.

According to the present invention, the contrast is controlled according to the brightness mean of one of the video signal having the controlled contrast and the video signal having the increased middle brightness signal level, which enables displaying an optimal image.

As described above, the present invention provides the display in which the contrast is improved according to the brightness mean of the inputted video signal to display the optimal image and the control method thereof.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A display comprising:
    an LCD panel operable to display a first video signal;
    a middle level controller operable to increase a middle brightness signal level of the first video signal;
    a first contrast controller operable to control a contrast of a second video signal outputted from the middle level controller to output a third video signal;
    a brightness mean calculating part operable to calculate a brightness mean of one of the second video signal from the middle level controller and the third video signal from the first contrast controller; and
    a second controller controlling the first contrast controller operable to control the contrast according to a result calculated by the brightness mean calculating part.

2. The display according to claim 1, further comprising a back light operable to illuminate the LCD panel and an inverter operable to supply driving power to the back light and to control an intensity of illumination of the back light,
    wherein the controller controls a dimming of the back light according to the result calculated by the brightness mean calculating part.

3. The display according to claim 1, wherein the first contrast controller controls the contrast in a contrast control range between a cutoff value and an upper limit value, and
    the second controller decreases the contrast control range of the contrast controller, as the brightness mean becomes higher, according to the result calculated by the brightness mean calculating part.

4. The display according to claim 3, further comprising a range mean calculating part operable to calculate a mean of an upper range between the brightness mean and the upper limit value and a mean of a lower range between the cutoff value and the brightness mean,
    wherein the controller controls the first contrast controller to form a first contrast transmitting curve having the upper range convex upwardly if the mean of the upper range is near the brightness mean and to form a second contrast transmitting curve having the upper range concave downwardly if the mean of the upper range is near the upper limit value and to form the contrast transmitting curve having the lower range convex upwardly if the mean of the lower range is near the cutoff value and to form the contrast transmitting curve having the lower range concave downwardly if the mean of the lower range is near the brightness mean, according to the result calculated by the brightness mean calculating part and a result calculated by the range mean calculating part.

5. The display according to claim 3, wherein the second controller controls the first contrast controller to form a contrast transmitting curve in which an upper range between the brightness mean and the upper limit value is convex upwardly and a lower range between the cutoff value and the brightness mean is concave downwardly.

6. The display according to claim 5, wherein the second controller controls the first contrast controller to form the contrast transmitting curve in which an increment of the upper range becomes larger and a decrement of the lower range becomes smaller as the brightness mean becomes smaller and the increment of the upper range becomes smaller and the decrement of the lower range becomes larger as the brightness mean becomes larger.

7. The display according to claim 2, further comprising a dimming processor operable to supply a dimming control signal to the inverter,
    wherein the second controller controls the dimming processor wherein the more the brightness mean is changed, the more the dimming control signal changes.

8. A control method of a display comprising an LCD panel to display video signal, the control method comprising:
    increasing a middle brightness signal level of the video signal;
    controlling a contrast of a video signal having an increased middle brightness signal level;

calculating a brightness mean of one of the video signal having the increased middle brightness signal level and a video signal having a controlled contrast; and controlling the contrast according to the calculated brightness mean.

9. The control method of the display according to claim 8, further comprising controlling a dimming of a back light to illuminate the LCD panel according to the brightness mean.

10. The control method of the display according to claim 8 wherein as a contrast control range between a cutoff value and an upper limit value decreases, the brightness mean increases.

11. The control method of the display according to claim 10, further comprising:

calculating a mean of an upper range between the brightness mean and the upper limit value and a mean of a lower range between the cutoff value and the brightness mean;

controlling the contrast by forming a contrast transmitting curve having the upper range convex upwardly if a mean of the upper range is near the brightness mean and forming the contrast transmitting curve having the upper range concave downwardly if the mean of the upper range is near the upper limit value and forming the contrast transmitting curve having the lower range convex upwardly if a mean of the lower range is near the cutoff value and forming the contrast transmitting curve having the lower range concave downwardly if the mean of the lower range is near the brightness mean.

12. The control method of the display according to claim 10, further comprising controlling the contrast controller by forming a contrast transmitting curve in which the upper range between the brightness mean value and the upper limit value is convex upwardly and the lower range between the cutoff value and the brightness mean is concave downwardly.

13. The control method of the display according to claim 12, further comprising forming the contrast transmitting curve in which an increment of the upper range becomes larger and a decrement of the lower range becomes smaller, as the brightness mean becomes smaller and the increment of the upper range becomes smaller and the decrement of the lower range becomes larger, as the brightness mean becomes larger.

14. The control method of the display according to claim 9, further comprising increasing a changeable range of a dimming control signal as the brightness mean becomes larger.

15. The display according to claim 1, wherein the first contrast controller controls the contrast in a contrast control range, and the second controller decreases the contrast control range as the brightness mean increases.

* * * * *